April 20, 1926. 1,581,602
H. C. SPONDER
COMBINED VISOR AND SIGN HOLDER FOR AUTOMOTIVE VEHICLES
Filed Sept. 4, 1924   2 Sheets-Sheet 1

INVENTOR:
Harry C. Sponder
BY
ATTORNEY.

April 20, 1926.
H. C. SPONDER
1,581,602
COMBINED VISOR AND SIGN HOLDER FOR AUTOMOTIVE VEHICLES
Filed Sept. 4, 1924    2 Sheets-Sheet 2
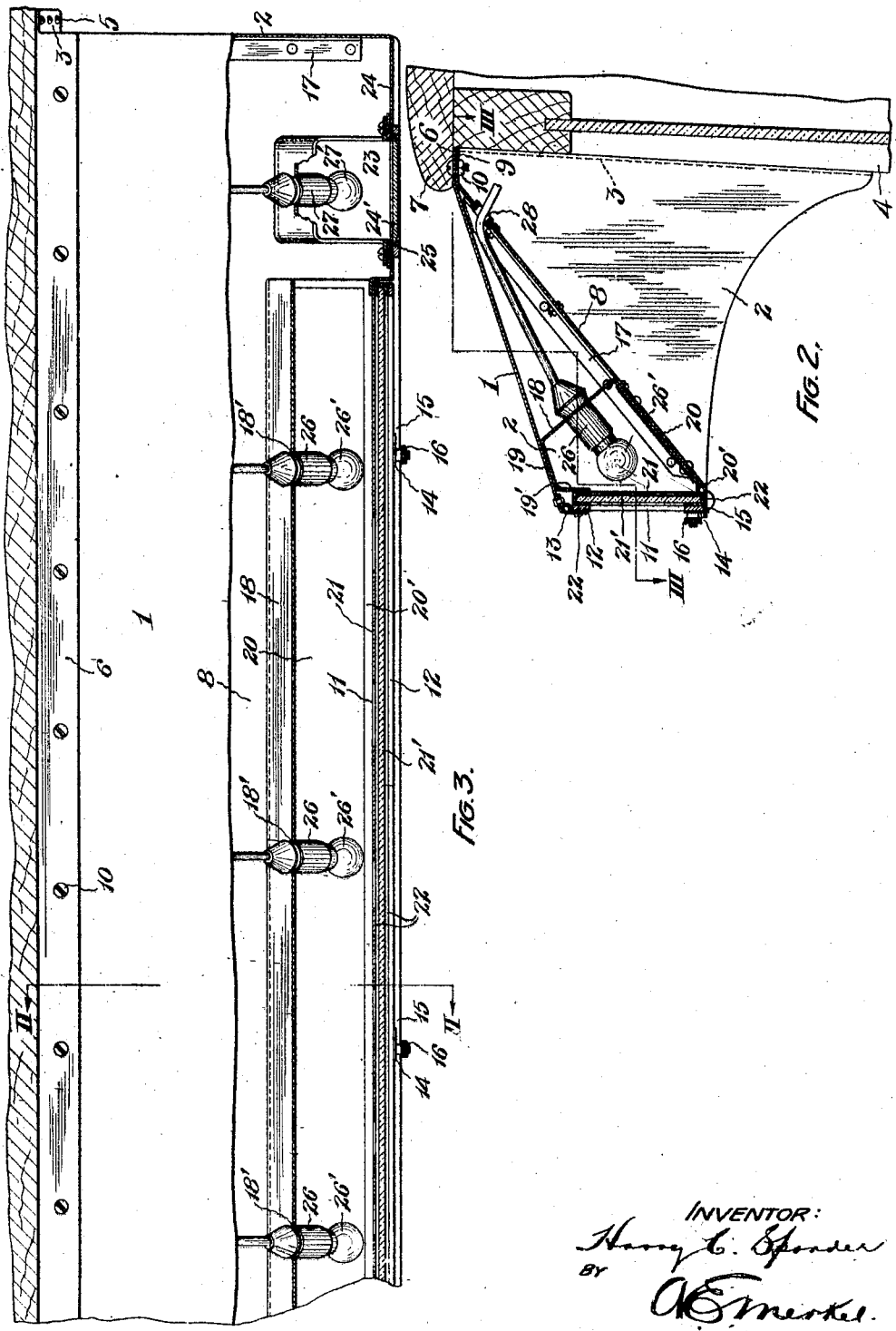
INVENTOR:
Harry C. Sponder
BY
A. E. Merkel.
ATTORNEY.

Patented Apr. 20, 1926.

1,581,602

UNITED STATES PATENT OFFICE.

HARRY C. SPONDER, OF CLEVELAND, OHIO, ASSIGNOR TO THE LANG BODY COMPANY, OF CLEVELAND, OHIO, A CORPORATION OF OHIO.

COMBINED VISOR AND SIGN HOLDER FOR AUTOMOTIVE VEHICLES.

Application filed September 4, 1924. Serial No. 735,772.

*To all whom it may concern:*

Be it known that I, HARRY C. SPONDER, a citizen of the United States, resident of Cleveland, county of Cuyahoga, and State of Ohio, have invented new and useful Improvements in Combined Visors and Sign Holders for Automotive Vehicles, of which the following is a specification, the principle of the invention being herein explained and the best mode in which I have contemplated applying that principle, so as to distinguish it from other inventions.

My invention relates to combined visors and sign holders for automotive vehicles, such as busses, on which it is required to carry a sign indicating the route or destination of the vehicle.

The object of the invention is to provide a device of the above-described character which will effectively perform the function of both a visor and sun or rain-shield and also provide adequate means for displaying a destination sign visible and distinguishable by day and night, and of a structure which will be economical of construction and easy to attach to or detach from the vehicle.

The said invention consists of means hereinafter fully described and particularly pointed out in the claims.

The annexed drawings and the following description set forth in detail certain means embodying my invention, the disclosed means, however, constituting but one of the various mechanical forms in which the principle of the invention may be employed.

In said annexed drawings:

Fig. 2 represents a vertical transverse section taken upon the plane indicated by line II—II, Fig. 3, and showing the visor attached to a fragmentary part of a vehicle body.

Fig. 3 represents a fragmentary section taken upon the plane indicated by lines III—III in Fig. 2.

Figure 1:
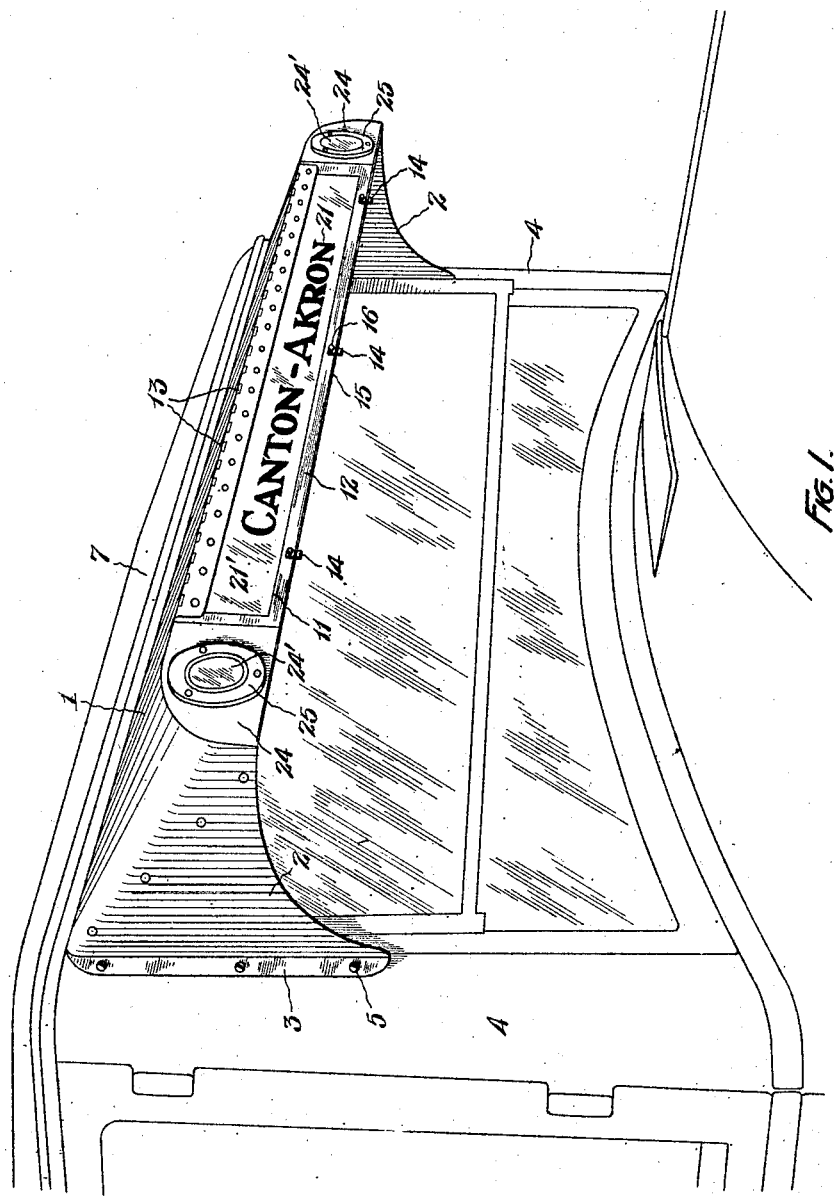
Figure 1 represents a perspective view of the front portion of a vehicle to which my invention has been applied.

The illustrated embodiment of my invention includes a top sheet-metal plate 1 bent downwardly at its end portions to form the vertical triangular end-members 2—2. The rear edge portions of said side members are provided with flanges 3—3 which may be secured to the corner posts 4—4 of the vehicle body by means of suitable screws 5.

The said top member 1 is formed with a rear horizontal flange 6 which extends beneath the projecting portion 7 of the vehicle top, Fig. 2, and said member inclines downwardly away from said vehicle top as shown.

A bottom member 8 is formed with a rear horizontal flange 9 which lies against the lower surface of flange 6 and these flanges are secured to each other by suitable means such as bolts and nuts 10.

Said member 8 also inclines downwardly away from the vehicle top but to a greater degree than top member 1, and forms a front rectangular opening 11 adjacent to which is hung a rectangular frame 12 by means of hinges 13, as will be understood. The bottom portion of frame 12 is detachably secured to the outer end of member 8, by suitable means, such as latches 14 engaging clips 15 and secured by means of thumb nuts 16, as is common practice and will also be understood.

The ends of member 8 are respectively secured to the inner surface of end members 2 by suitable means, such as angle bars 17 riveted thereto.

Extending transversely of the enclosure formed as above described, is an intermediate wall 18 formed with the upper and lower flanges, 19 and 20, which are suitably secured to the inner surfaces of members 1 and 8 respectively, Fig. 2. This wall has its lateral ends removed from the end walls 2—2 of the enclosure, Fig. 3.

Flanges 19 and 20 are formed with auxiliary flanges 19' and 20' respectively, which form stops for the sign 21.

A glass plate 21' provided with a peripheral rubber gasket 22 lies against the front of said sign and is secured in place by the frame 12, Fig. 2.

Laterally of each end of said wall 18 and upon the interior of the main inclosure, are two secondary enclosures 23 (one only being shown) whose front ends are open and abut the inner surfaces of two front sheet-metal wall members 24—24, Fig. 1, which are suitably secured to the fronts of members 1 and 2, as will be readily understood. Round holes are formed in said front members which register with the fronts of the secondary enclosures 23 and which are covered by suitably colored glass plates 24' secured in place by frames 25.

The said wall 18 is provided with a suitable number of openings 18', in which are secured the sockets 26 of electric light bulbs 26' located in front of said wall and behind the sign 21.

The back wall of each of the secondary enclosures 23 is also provided with an opening for the socket 27 of an electric light bulb 27' which is located in the interior thereof as shown.

Suitable circuit connections are provided for each socket which pass into the enclosure through openings 28 formed in the bottom member 8, Fig. 3.

The sign 21 is made suitably transparent or translucent to permit the legend thereon to be readily visible by day or when illuminated by the bulbs at night.

It will be seen from the above-described construction that the device forms a downwardly inclined and forwardly extending visor for shielding the driver from the sun's rays and also for preventing rain from obstructing vision through the windshield, and at the same time forms an effective sign-carrier which permits the sign to be readily removed and replaced. Suitable marker lights are provided by the enclosures 23, the plates 24' and bulbs 27'. Preferably the inner surface of walls 18, 19, and 20 are given a coating of white enamel so as to increase the reflecting action of said walls.

What I claim is:

1. The combination with a vehicle having an upper body, of a combined visor and sign-holder consisting of a sheet metal plate forming a top member and bent downwardly to form end members, a bottom member having its rear edge portion joined with the rear edge portion of said top member and diverging from said top member forwardly to form a front space adapted to receive a suitable sign, illuminating means intermediate of said top and bottom members and means for securing such visor to the vehicle front.

2. The combination with a vehicle having an upper body; of a combined visor and sign-holder body structure consisting of a top member, end members, and a bottom member inclined with reference to said top member to form a front space adapted to receive the sign; the rear edge portion of said bottom member being joined to the rear edge portion of said top member.

3. The combination with a vehicle having a body including a top; of a combined visor and sign-holder having a top, bottom and end members forming a front opening; the rear edge portion of said top and bottom members being joined and secured to the bottom surface of said vehicle top; the said visor member being inclined downwardly from said vehicle top.

Signed by me this 21st day of July, 1924.

HARRY C. SPONDER.